(12) United States Patent
Pieger et al.

(10) Patent No.: US 8,987,634 B2
(45) Date of Patent: Mar. 24, 2015

(54) DETERMINING POWDER FEED NOZZLE MISALIGNMENT

(75) Inventors: Markus Pieger, Stuttgart (DE); Sebastian Kaufmann, Plizhausen (DE); Philip Anthony Carroll, Lymm (GB)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 884 days.

(21) Appl. No.: 13/105,257

(22) Filed: May 11, 2011

(65) Prior Publication Data

US 2011/0220621 A1 Sep. 15, 2011

Related U.S. Application Data

(63) Continuation-in-part of application No. PCT/DE2009/001597, filed on Nov. 13, 2009.

(30) Foreign Application Priority Data

Nov. 13, 2008 (DE) .......................... 10-2008 057 309

(51) Int. Cl.
*B23K 26/14* (2014.01)
*B23K 26/342* (2014.01)
(Continued)

(52) U.S. Cl.
CPC ........... *B23K 26/1411* (2013.01); *B23K 26/041* (2013.01); *B23K 26/043* (2013.01);
(Continued)

(58) Field of Classification Search
CPC .. B23K 26/032; B23K 26/03; B23K 26/1464; B23K 26/1476; B23K 26/1494; B23K 26/345; B23K 26/041; B23K 26/043; B23K 26/0853; B23K 26/1411; B23K 26/1458; B23K 35/0244
USPC .............. 219/121.63, 121.64, 121.84, 121.83
See application file for complete search history.

(56) References Cited

U.S. PATENT DOCUMENTS 6,459,951 B1   10/2002   Griffith et al.
7,223,935 B2    5/2007   Wessner
(Continued)

FOREIGN PATENT DOCUMENTS

CN    1415451 A    5/2003
CN    1735714 A    2/2006
(Continued)

OTHER PUBLICATIONS

English Translation of Chinese Office Action from corresponding Chinese Application No. 200980150082.5, mailed Aug. 23, 2013, 7 pages.

(Continued)

*Primary Examiner* — Geoffrey S Evans
(74) *Attorney, Agent, or Firm* — Fish & Richardson P.C.

(57) ABSTRACT

This invention relates to a method for determining misalignment of a powder feed nozzle and a laser beam. The method includes forming a test structure on a workpiece in at least two different directions by deposition laser welding with powder at substantially constant deposition parameters without relative rotation between a powder feed nozzle and a laser beam, measuring heights and/or wall thicknesses of the test structure along the test structure, and determining a direction and/or an amount of misalignment of the powder feed nozzle relative to the laser beam based on the measured heights and/or wall thicknesses.

18 Claims, 2 Drawing Sheets

(51) Int. Cl.
  *B23K 26/04*   (2014.01)
  *B23K 26/08*   (2014.01)
  *B23K 31/12*   (2006.01)
  *B23K 26/34*   (2014.01)
  *B23K 35/02*   (2006.01)

(52) U.S. Cl.
  CPC ......... *B23K26/0853* (2013.01); *B23K 26/1458* (2013.01); *B23K 31/12* (2013.01); *B23K 26/345* (2013.01); *B23K 35/0244* (2013.01)
  USPC ............. 219/121.84; 219/121.63; 219/121.83

(56) References Cited

U.S. PATENT DOCUMENTS

| | | | |
|---|---|---|---|
| 7,638,731 B2 * | 12/2009 | Kosmowski | 219/121.68 |
| 2004/0133298 A1 * | 7/2004 | Toyserkani et al. | 700/166 |
| 2005/0023257 A1 | 2/2005 | Pyritz et al. | |
| 2005/0263509 A1 * | 12/2005 | Yamazaki et al. | 219/121.84 |
| 2006/0049153 A1 | 3/2006 | Cahoon et al. | |
| 2007/0024663 A1 * | 2/2007 | Yamanobe | 347/19 |
| 2007/0084837 A1 * | 4/2007 | Kosmowski | 219/121.68 |
| 2008/0210668 A1 * | 9/2008 | Clark et al. | 219/121.85 |

FOREIGN PATENT DOCUMENTS

| | | |
|---|---|---|
| DE | 102004034777 A1 | 3/2006 |
| EP | 1459835 A | 9/2004 |
| EP | 1950001 A1 | 7/2008 |
| JP | 1104493 | 7/1989 |

OTHER PUBLICATIONS

International Search Report from corresponding application No. PCT/DE2009/001597, mailed Apr. 6, 2010, with English translation, 8 pages.

International Preliminary Report on Patentability and Written Opinion from corresponding PCT Application No. PCT/DE2009/001597, issued May 17, 2011, 8 pages.

English translation of Office Action from corresponding Chinese Application No. 200980150082.5 dated Jun. 11, 2014, 8 pages.

* cited by examiner

DETERMINING POWDER FEED NOZZLE MISALIGNMENT

CROSS-REFERENCE TO RELATED APPLICATIONS

This application is a continuation-in-part of, and claims priority under 35 U.S.C. §120 to, PCT/DE2009/001597,filed on Nov. 13, 2009, and designating the U.S., which claims priority under 35 U.S.C. §119 to German Patent Application No. 10 2008 057 309.4, filed on Nov. 13, 2008.The contents of the prior applications are hereby incorporated by reference in their entirety.

TECHNICAL FIELD

The present invention relates to laser processing machines having powder feed nozzles for feeding powder as additional material onto a workpiece and to methods and machines for determining misalignment of a powder feed nozzle with respect to a laser beam.

BACKGROUND

In laser material processing using a powdery additional material, e.g., in deposition laser welding with powder or laser metal deposition (LMD), metal powder is applied onto a substrate through introduction of laser beam energy. It is possible to produce many 2-dimensional and 3-dimensional surfaces or volumes by disposing individual powder paths next to each other and on top of each other to form individual layers and/or layer packages. During deposition laser welding with powder, the quality of the layer can depend on the adjustment of the powder focus with respect to the laser beam and also on the powder quality. In order to obtain high accuracy when processing components in this fashion, and in particular when several layers are formed on top of each other, it is generally desired that the layer characteristics be uniform and reproducible and/or be adjustable during the process.

One way to increase accuracy is to implement process monitoring and control techniques. For example, US 2004/0133298 A1 discloses a method in which several layer properties, such as dimensions, solidification rate, and/or roughness are monitored and, based on those properties, laser power and feed rate can be adjusted. U.S. Pat. No. 6,459,951 B1 discloses a method in which, in addition to laser power and feed rate, the powder application rate can be regulated through the process temperature. This document does not mention adjustment of the powder and laser beam focus with respect to each other or adjustment of the point of impingement of the powder with respect to the laser beam on the workpiece surface.

SUMMARY

In certain aspects of the invention, a method includes detecting misalignment of a powder feed nozzle relative to a laser beam by forming and analyzing a test structure.

This method can allow for more accurate alignment and, in some cases, automated alignment of the powder feed nozzle and the laser beam. Such a test structure can be formed on a workpiece in at least two different directions by deposition laser welding with powder with constant deposition parameters and without relative rotation between the powder feed nozzle and the laser beam. The heights and/or wall thicknesses of the test structure can be measured and the direction and, if necessary, an amount of misalignment of the powder feed nozzle relative to the laser beam can be determined based on the variations in wall heights and/or wall thicknesses measured in different directions.

As used in this application, "different directions" means two directions on the flat workpiece surface, which extend neither collinearly nor parallel to each other.

In some embodiments, where the powder nozzle and laser beam are misaligned, the powder focus and the laser focus are directed to at least two different positions with respect to the contour of the test structure. In such embodiments, since the powder nozzle is fixed at a certain position in relation to the laser beam, no additional motion components except the components that are used to articulate the laser beam head during processing are required to test for misalignment. By forming a test structure in at least two different directions, it is possible to generate relative motion of the powder focus about the laser focus with respect to the direction of the test structure being formed. The changing relative motion of the powder nozzle and the laser beam can result, when misaligned, in changing deposition laser weld characteristics.

In some embodiments, a test structure or test geometry is formed on a workpiece by deposition laser welding with powder and weld properties such as heights of the deposition layer are measured. The misalignment can then be determined via spatially resolved differences in the height of the layer structure. It has been found that when deposition laser welding with constant deposition parameters, a powder focus which trails the laser beam generates a layer structure having an increased height and a powder focus which leads the laser beam generates a layer structure having a decreased height. Therefore, the position of the powder focus with respect to the laser beam can be determined by the test structure on the workpiece. The test structure, in some cases, includes all possible relative positions of the powder focus and the laser beam. By subsequent measurement of the test structure using the value of the height difference and its directional distribution, the misalignment can be determined.

The heights and wall thicknesses of the formed test structure can generally be measured with conventional measuring methods, such as light section measurement methods, (e.g., a 3-dimensional optical measuring technique, which permits measurement of a height profile along a projected light line and uses the principle of triangulation). In some cases, an associated light section sensor includes a line projector (in most cases with a laser as a light source) which projects a narrow bright line onto the object to be measured, and an electronic camera which observes the projection of the line on the object. The displacement of the line in the camera image is converted into 3-dimensional coordinates using the methods of photogrammetry to provide dimensions of the profile.

In some embodiments, a self-contained, annular (e.g., circular or elliptical) wall can be formed as the test structure on the workpiece, which advantageously can have a maximum extension or a maximum diameter of 30 mm to 50 mm. A circular or elliptical wall of this type can typically produce all possible relative positions of the powder focus and the laser beam along the test structure due to the annular path of motion.

In some embodiments, instead of annular structures, it is also possible to form a test structure in the form of several walls or webs in different coordinate directions or angular positions, which extend in the different directions. In such embodiments, the accuracy can depend on the number of walls or webs formed in different directions.

In some embodiments, misalignment can be determined based on analyzing weld characteristics and geometry and comparing measured values of the weld characteristics to reference geometries with different known defects.

Once misalignment is measured, the direction and, if necessary, the amount of the required adjustment of the powder feed nozzle relative to the laser beam can be selected based on the variations in wall height and/or thickness measured in the test structure along the different directions of the test structure, and then the required adjustment can be performed. When the amount of the required adjustment of the powder feed nozzle cannot be exactly specified based on testing results but only estimated, it is also possible to perform the adjustment in several iteration steps. In some cases, iterations are performed in three steps or less.

The adjustment of the powder feed nozzle can be achieved either automatically via adjustment drives, (e.g., electrically controlled devices), or manually by an operator who is presented with the correction direction and performs the corresponding adjustment of the powder feed nozzle.

The powder feed nozzle can be adjusted relative to the laser beam in the direction of the test structure where the maximum height of the formed test structure has been measured, i.e. where the highest layer structure was obtained. If this direction does not correspond to one of the adjustment axes of the powder feed nozzle, the required adjustment motion of the powder feed nozzle can be distributed to multiple adjustment axes proportionally. In other words, suitable evaluation of the maximum height difference can be used to predetermine suitable actuation of the powder feed nozzle for one or both adjustment axes. Depending on the height difference and the required resolution or tolerable height differences, which also depend on the overall number of layers and the addition of deviations which must therefore be taken into consideration, the actuations can be implemented either incrementally or gradually.

In some embodiments, the powder feed nozzle is automatically adjusted relative to the laser beam using the measured heights and/or wall thicknesses in accordance with a corresponding algorithm to provide more accurate processing.

In addition to nozzle adjustment, in some aspects of the invention, forming and measuring a test structure also allows for analyzing additional factors that can influence the layer quality. When the nozzle has been adjusted according to the methods discussed above and the resulting structures are nevertheless different, which can be related to a predetermined statistical structure height due to nozzle adjustment, one can gain information about quality deviations in the powder. In particular, after a powder batch change, the quality of the powder can be checked in this manner. When there are deviations in height within one powder batch, one can conclude that there is a problem with the beam source or the beam guidance and/or with beam shaping and/or powder feed. The associated laser processing machine can be provided with corresponding devices for monitoring and identifying parameter deviations in order to be able to determine such correlations.

In some aspects, the invention also relates to laser processing machines which are suitable for performing the above-described misalignment determination and adjustment methods. The machine can include a laser beam generator for generating a laser beam, a powder feed nozzle for supplying powder as additional material onto the workpiece, and a laser processing head for directing the laser beam onto the workpiece.

In some embodiments, a laser processing machine has a measuring device for measuring the heights and/or wall thicknesses of a test structure applied onto a workpiece using deposition laser welding with powder and an evaluation unit (e.g., a processor) that is electrically connected to the measuring device. The test structure measurements can be provided to the evaluation unit which determines the direction, and if necessary, an amount of misalignment of the powder feed nozzle relative to the laser beam based on the measured heights and/or wall thicknesses of the test structure.

In some embodiments, the measuring device advantageously has one or more sensors, such as triangulation sensors or optical distance sensors, for measuring the height of formed test structures and providing the values to the evaluation unit. The evaluation unit can then calculate the direction and/or an amount of the existing misalignment. In order to permit measurement by these sensors, in some cases, the height of the formed test structure does not exceed a defined height, which can be limited by the resolution of the measuring device.

In some embodiments, the powder feed nozzle is formed by an outer annular opening of a coaxial nozzle, wherein the laser beam passes through an inner opening of the coaxial nozzle.

In some embodiments, the laser processing machine advantageously has an adjustment device for adjusting the powder feed nozzle relative to the laser beam. In such embodiments, the evaluation unit can determine the direction and/or an amount of the required adjustment of the powder feed nozzle relative to the laser beam as control variables for the adjustment device based on the measured heights and/or wall thicknesses of a test structure applied in at least two different directions onto the workpiece with constant deposition parameters and without relative rotation between the powder feed nozzle and the laser beam.

Certain aspects of the invention also relate to a computer product having a code (or algorithm) which can be adjusted for performing all steps of the above-mentioned method.

Further advantages of the invention can be extracted from the claims, the description and the drawing. The features mentioned above and below may be used individually or collectively in arbitrary combination. The embodiments shown and described are not to be understood as exhaustive enumeration but have exemplary character for describing the invention.

DESCRIPTION OF DRAWINGS

Like reference symbols in the various drawings indicate like elements.

DETAILED DESCRIPTION

Figure 1:
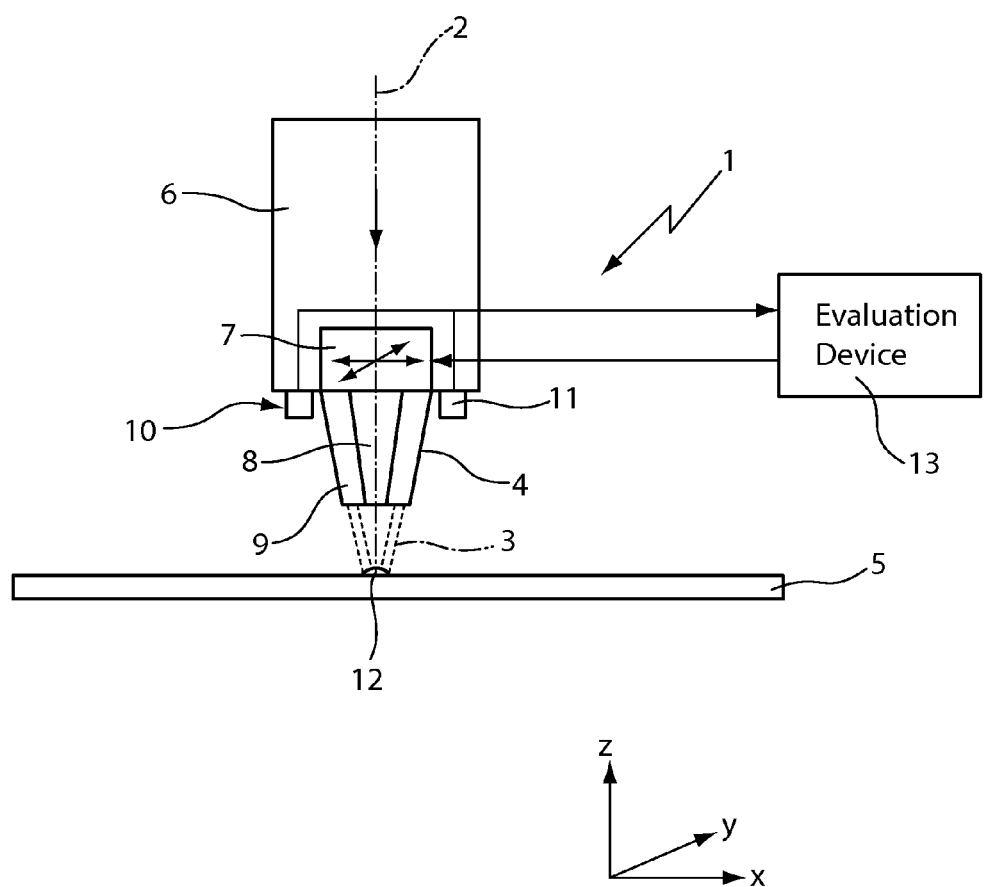
FIG. 1 shows a laser processing machine having a powder feed nozzle that can be adjusted relative to a laser beam generated by the laser processing machine.

Referring to FIG. 1, a laser processing machine 1 is used for material processing of workpieces using a laser beam 2 and a powder (e.g. metal powder) 3, which is supplied as additional material via a powder feed nozzle 4 of the machine 1 onto a workpiece 5 to be processed.

The laser processing machine 1 includes a laser processing head 6 for directing the laser beam 2 in the z direction onto the workpiece 5. The laser processing head 6 has an adjustment or shifting device 7 which can be driven by electrical devices, e.g., servomotors, for displacing the powder feed nozzle 4 in the x and y directions relative to the laser beam 2. The powder feed nozzle 4 is provided at the bottom of the laser processing head 6 and is formed in the illustrated embodiment as a coaxial nozzle having an inner opening 8 through which the laser beam 2 passes and an outer annular opening 9 through which the powder 3 is applied onto the workpiece 5. A measuring device 10 including several sensors 11 for measuring the height of the workpiece 5 is provided at the bottom of the laser processing head 6.

In laser material processing using powder 3, such as laser welding or deposition laser welding with powder, the processing quality significantly depends on the collinear orientation of a point of impingement (powder focus) 12 of the powder 3 on the workpiece 5 relative to the laser beam 2. When, for example, during deposition laser welding with powder, the powder focus 12 formed on the workpiece 5 is not oriented collinearly with respect to the laser beam 2 (e.g., when the powder feed nozzle 4 is not collinearly oriented with respect to the laser beam 2), the resulting structure can have an incorrect height. For example, a powder focus 12 which trails the laser beam 2 can generate a layer structure having an increased height, whereas a powder focus 12 which leads the laser beam 2 can generate a layer structure having a decreased height.

In order to determine a deviation of the powder focus 12 from the collinear orientation with respect to the laser beam 2 and thereby the misalignment of the powder nozzle 4, and to subsequently correct this misalignment, the following process can be implemented.

Figure 2:
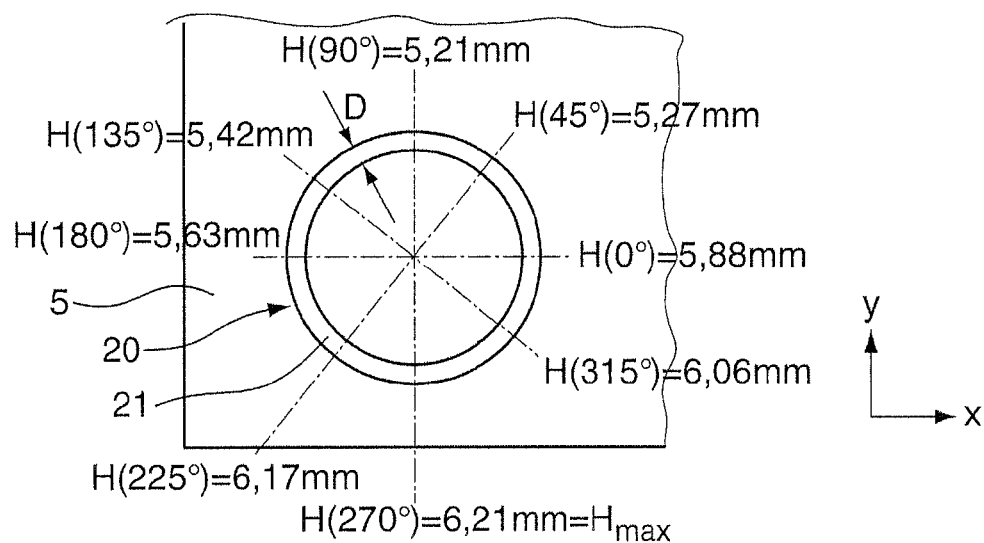
FIG. 2 shows a circular test structure produced by the laser processing machine of FIG. 1 for adjusting the powder feed nozzle.

The test structure 20, which is shown in FIG. 2 and has the form of a self-contained circular wall 21, can be formed in a clockwise direction on a flat surface of the workpiece 5. The test structure 20 can be formed by the laser processing machine 1 through deposition laser welding with powder with constant deposition parameters and without relative rotation between the powder feed nozzle 4 and the laser beam 2 about the z axis or an axis which is parallel thereto. Therefore, during the forming of the test structure, the powder focus 12 remains at a constant position in relation to the laser beam 2 while the laser processing head 6 translates above the workpiece 5.

While the circular wall 21 is applied to the workpiece 5, all possible positions of the powder focus 12 relative to the laser beam 2 along the test structure 20 are created and can be observed, provided that the powder focus 12 is not oriented in a collinear direction to the laser beam 2, such that the height H of the wall 21 can be monitored to determine misalignment between the laser beam 2 and the powder focus 12. For example, the height H of the wall 21 typically has a maximum value when the powder focus 12 directly trails the laser beam 2 in the feed direction (i.e., the direction of movement of the processing head 6), and the height H typically has a minimum value when the powder focus 12 directly leads the laser beam 2 in the feed direction. The height H of the circular wall 21 is measured in a spatially resolved fashion by the measuring device 10. The relative position of the powder focus 12 and thereby the relative position of the powder feed nozzle 4 with respect to the laser beam 2 is determined using an electronic evaluation device 13 (shown in FIG. 1) based on the measured data or the height profile determined therefrom. In case of misalignment, the direction and/or the amount of the required adjustment of the powder feed nozzle 4 relative to the laser beam 2 are determined as control values for the servomotors of the adjustment device 7. Therefore, the required adjustment of the powder feed nozzle 4 can be performed fully automatically.

FIG. 2 also shows an example of height data of the circular wall 21. Misalignment of the powder feed nozzle 4 and thereby the required correction adjustment (e.g. −300 μm in the x direction and −20 μm in the y direction in this example), are determined by monitoring the differences in height (e.g., the maximum height difference of 1 mm in the y direction and a minimum height difference of 0.15 mm in the x direction). The required correction adjustment is advantageously performed by moving the powder feed nozzle 4 in the same direction as the test structure 20 at the location in which the maximum height of the formed circular wall 21 was measured. In the exemplary case, the maximum wall height Hmax of 6.21 mm was measured at 270° and since the test structure 20 was formed by a clockwise motion, the powder feed nozzle 4 was trailing the laser beam 2 when the laser beam 2 was traveling in the −x direction. Therefore, to better align the powder feed nozzle 4 with the laser beam 2, the powder feed nozzle 4 should be moved in the −x direction towards the laser beam 2.

The round test structure 20 illustrated in FIG. 2 is generally able to detect all directions of motion of the powder feed nozzle 4 with respect to the laser beam 2, from which the correction parameters for the required adjustment can be determined. With a circular test structure 20 which theoretically represents all relative positions, or at least a sufficient number of relative positions depending on the resolution, the actuation direction can be determined but the actuation distance which depends on a plurality of application conditions may not necessarily be determined exactly and therefore generally requires approximation over several iteration steps.

Figure 3:
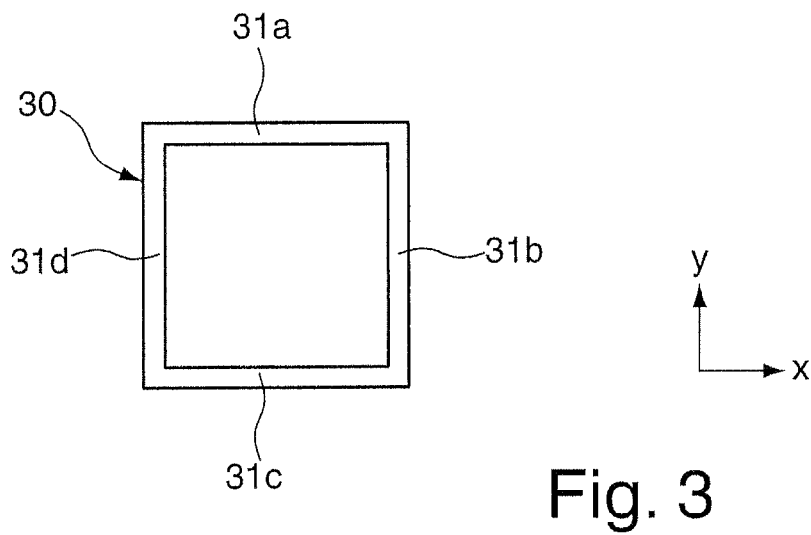
FIG. 3 shows a rectangular test structure formed by the laser processing machine of FIG. 1.

Shown in FIG. 3, a rectangular test structure 30 with four walls 31a-31d can be formed on a workpiece 5 by deposition laser welding with powder. The walls of this test structure 30 only extend in two different directions (x, y). The correction parameters for the powder feed nozzle 4 in the x and y directions can be determined from the measured heights of the walls 31a-31d. Several iteration steps are typically required for exact orientation.

Figure 4:
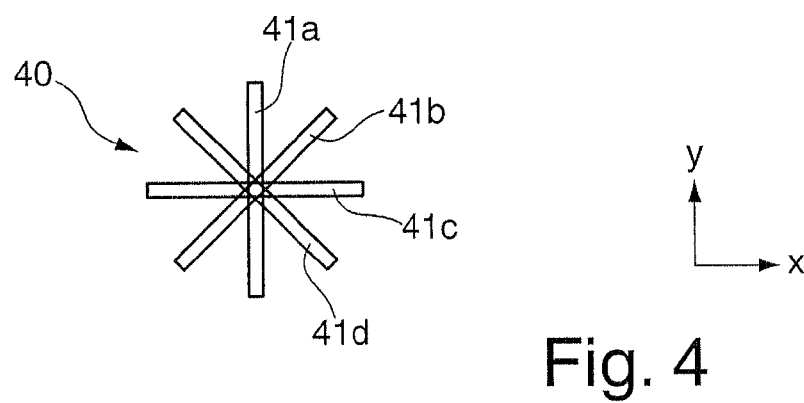
FIG. 4 shows an asterisk-shaped test structure having multiple intersecting walls formed by the laser processing machine of FIG. 1.

In FIG. 4, a star-shaped or asterisk-shaped test structure 40 with four walls 41a-41d is formed on the workpiece 5 by deposition laser welding with powder. The walls extend in four different directions (x, y, and two diagonals). The correction parameters for the powder feed nozzle 4 can be determined from the measured heights of the walls 41a-41d, if necessary, through suitable interpolation, in the x and y directions. Several iteration steps are typically required for exact orientation.

In addition to, or as an alternative to, the measurement of the heights of the test structures 20, 30, 40, it is also possible to measure the wall thickness D of the test structures 20, 30, 40. For example, a powder focus 12 which trails the laser beam 2 can generate test structure 20, 30, 40 having a decreased wall thickness D, whereas a powder focus 12 which leads the laser beam 2 can generate a test structure 20, 30, 40 having an increased wall thickness D.

As discussed above, the laser processing machines described herein can include a computer product having a code (or algorithm) which can be adjusted for performing the steps of the above-described misalignment detection methods and alignment correction methods.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, for example, a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (for example, multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

The processes described in this specification can be performed by one or more programmable processors executing one or more computer programs to perform actions by operating on input data and generating output. The processes can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of nonvolatile memory, media and memory devices, including by way of example semiconductor memory devices, for example, EPROM, EEPROM, and flash memory devices; magnetic disks, for example, internal hard disks or removable disks; magneto optical disks; and CD ROM and DVD-ROM disks. The processor and the memory can be supplemented by, or incorporated in, special purpose logic circuitry.

A number of embodiments of the invention have been described. Nevertheless, it will be understood that various modifications may be made without departing from the spirit and scope of the invention. Accordingly, other embodiments are within the scope of the following claims.

What is claimed is:

1. A method for determining misalignment of a powder feed nozzle, the method comprising:
    forming a test structure on a workpiece in at least two different directions by deposition laser welding with powder with substantially constant deposition parameters without relative rotation between a powder feed nozzle and a laser beam;
    measuring heights and/or wall thicknesses of the test structure along the test structure; and
    determining, via one or more processors, a direction and/or an amount of misalignment of the powder feed nozzle relative to the laser beam based on the measured heights and/or wall thicknesses.

2. The method according to claim 1, wherein the heights are measured by a light section method.

3. The method according to claim 1, wherein the test structure is formed of multiple walls on the workpiece, the walls extending in different directions.

4. The method according to claim 1, wherein the test structure is annular.

5. The method according to claim 4, wherein the test structure is circular or elliptical.

6. The method according to claim 1, wherein determining the direction and/or the amount of misalignment comprises determining a location along the test structure where the measured height has a maximum value.

7. The method according to claim 6, further comprising adjusting the position of the powder feed nozzle based on the location along the test structure where the measured height has a maximum value.

8. The method according to claim 7, wherein adjusting the position of the powder feed nozzle includes translating the powder feed nozzle along a plane transverse to the laser beam.

9. The method according to claim 7, wherein adjusting the position of the powder feed nozzle includes moving the powder feed nozzle relative to the laser beam at least in the traveling direction of the laser beam at the location of the test structure where the height of the formed test structure was measured to have the maximum value.

10. The method according to claim 7, wherein adjusting the position of the powder feed nozzle is performed automatically based on the measured heights and/or wall thicknesses of the test structure.

11. A machine for laser processing of a workpiece, the machine comprising:
- a powder feed nozzle that supplies a powder as additional material onto the workpiece;
- a laser processing head that directs a laser beam onto the workpiece;
- a measuring device that measures heights and/or wall thicknesses of a test structure applied to the workpiece in different directions using the laser beam and the powder; and
- an evaluation device that determines a direction and/or an amount of misalignment of the powder feed nozzle relative to the laser beam based on the measured heights and/or wall thicknesses.

12. The machine according to claim 11, wherein the powder feed nozzle and the measuring device are attached to the laser processing head.

13. The machine according to claim 11, wherein the powder feed nozzle is formed as a coaxial nozzle comprising an inner opening through which the laser beam passes, and an outer annular opening through which the powder is applied onto the workpiece.

14. The machine according to claim 11, further comprising an adjustment device that adjusts the position of the powder feed nozzle relative to the laser beam, wherein the evaluation device determines a required adjustment of the powder feed nozzle position to reduce misalignment between the feed nozzle and the laser beam based on the measured heights and/or wall thicknesses of the test structure.

15. The machine according to claim 11, wherein the machine is configured to supply the powder onto the workpiece in at least two different directions and with substantially constant deposition parameters.

16. The machine according to claim 11, wherein the measuring device comprises one or more sensors.

17. The machine according to claim 16, wherein the one or more sensors comprise a triangulation sensor.

18. A non-transitory computer storage medium encoded with a computer program, the computer program comprising instructions that when executed by one or more computers cause the one or more computers to perform operations for determining misalignment of a powder feed nozzle, the operations comprising:
- forming a test structure on a workpiece in at least two different directions by deposition laser welding with powder at substantially constant deposition parameters without relative rotation between a powder feed nozzle and a laser beam;
- measuring heights and/or wall thicknesses of the test structure along the test structure; and
- determining a direction and/or an amount of misalignment of the powder feed nozzle relative to the laser beam based on the measured heights and/or wall thicknesses.

* * * * *